(12) United States Patent
Lenk et al.

(10) Patent No.: US 10,072,895 B2
(45) Date of Patent: Sep. 11, 2018

(54) METHOD AND DEVICE FOR DISCHARGING A STRATIFIED THERMAL STORAGE TANK

(71) Applicant: Siemens Aktiengesellschaft, Munich (DE)

(72) Inventors: Uwe Lenk, Zwickau (DE); Florian Reissner, Nuremberg (DE); Jochen Schaefer, Nuremberg (DE); Alexander Tremel, Moehrendorf (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 113 days.

(21) Appl. No.: 15/119,045

(22) PCT Filed: Jan. 21, 2015

(86) PCT No.: PCT/EP2015/051104
§ 371 (c)(1),
(2) Date: Aug. 15, 2016

(87) PCT Pub. No.: WO2015/121036
PCT Pub. Date: Aug. 20, 2015

(65) Prior Publication Data
US 2016/0356553 A1      Dec. 8, 2016

(30) Foreign Application Priority Data
Feb. 17, 2014   (DE) .................... 10 2014 202 846

(51) Int. Cl.
*F28D 20/02*   (2006.01)
*F22B 1/16*    (2006.01)
(Continued)

(52) U.S. Cl.
CPC .............. *F28D 20/021* (2013.01); *F01K 3/12* (2013.01); *F01K 25/08* (2013.01); *F22B 1/028* (2013.01);
(Continued)

(58) Field of Classification Search
CPC .............. F28D 20/021; F28D 20/0039; F28D 2020/0082; F28D 2020/0069; F22B 1/16;
(Continued)

(56) References Cited

U.S. PATENT DOCUMENTS 3,988,895 A * 11/1976 Sheinbaum ............. F01K 3/185
                                                    122/31.1
4,202,177 A *  5/1980 Garrett ...................... F03G 7/04
                                                    165/45
(Continued)

FOREIGN PATENT DOCUMENTS

DE         2852064 A1    6/1979 ............. F01K 25/10
DE     102010044200 A1   1/2012 ............. C10B 53/00
(Continued)

OTHER PUBLICATIONS

Goeppert, S. et al., "Be- und Entladesysteme für thermische Schichtenspeicher: Teil 1—Überblick," Chemie Ingenieur Technik, Bd. 80, No. 3, 7 pages (German language w/ English statement of relevance), 2008.
(Continued)

*Primary Examiner* — Hoang Nguyen
(74) *Attorney, Agent, or Firm* — Slayden Grubert Beard PLLC

(57) ABSTRACT

A method and a device for discharging a thermal stratification storage tank are provided, wherein a first thermal stratification storage tank has a first temperature in a first subsection and a second temperature in a second subsection, when the working fluid of an organic Rankine cycle in the
(Continued)

liquid aggregate state in a fluid heat transfer medium of the first thermal stratification storage tank is introduced into the first or second subsection and brought into direct material contact with the heat transfer medium, wherein at the second temperature in the second subsection the pressure in the first thermal stratification storage tank is less than or equal to the vapor pressure of the working fluid.

15 Claims, 2 Drawing Sheets

(51) Int. Cl.
*F01K 3/12* (2006.01)
*F01K 25/08* (2006.01)
*F22B 1/02* (2006.01)
*F28D 20/00* (2006.01)

(52) U.S. Cl.
CPC ............ *F22B 1/16* (2013.01); *F28D 20/0039* (2013.01); *F28D 2020/0069* (2013.01); *F28D 2020/0082* (2013.01); *Y02E 60/142* (2013.01)

(58) Field of Classification Search
CPC . F22B 1/028; F01K 3/12; F01K 25/08; Y02E 60/142
USPC .......................................... 60/649, 673, 659
See application file for complete search history.

(56) References Cited

U.S. PATENT DOCUMENTS

| 4,262,485 | A | * | 4/1981 | Kuroda | F01K 27/02 165/104.13 |
| 4,272,960 | A | * | 6/1981 | Wahl, III | F03G 7/04 202/233 |
| 4,276,748 | A | * | 7/1981 | Wahl, III | F03G 7/04 165/111 |
| 4,324,102 | A | * | 4/1982 | Woinsky | F03G 7/04 60/641.3 |
| 4,465,056 | A | | 8/1984 | Elata | 126/567 |
| 4,920,750 | A | | 5/1990 | Iishiki et al. | 60/671 |
| 2012/0067047 | A1 | | 3/2012 | Peterson et al. | 60/651 |

FOREIGN PATENT DOCUMENTS

| DE | 102011015530 A1 | 10/2012 | ............ F28D 20/00 |
| JP | 60126592 A | 7/1985 | ............ F01K 25/10 |
| KR | 19990087579 A | 12/1999 | ............ F01K 13/02 |
| KR | 20110035302 A | 4/2011 | ............ F03G 7/06 |
| WO | 2012/080970 A2 | 6/2012 | ............ F01K 3/00 |
| WO | 2013/180685 A1 | 12/2013 | ............ F01K 25/08 |
| WO | 2015/121036 A1 | 8/2015 | ............ F01K 25/08 |

OTHER PUBLICATIONS

German Office Action, Application No. 102014202846.9, 7 pages, Oct. 9, 2014.
International Search Report and Written Opinion, Application No. PCT/EP2015/051104, 14 pages, May 29, 2015.
Korean Notice of Allowance, Application No. 20167025140, 3 pages, Jul. 31, 2017.

* cited by examiner

METHOD AND DEVICE FOR DISCHARGING A STRATIFIED THERMAL STORAGE TANK

CROSS-REFERENCE TO RELATED APPLICATIONS

This application is a U.S. National Stage Application of International Application No. PCT/EP2015/051104 filed Jan. 21, 2015, which designates the United States of America, and claims priority to DE Application No. 10 2014 202 846.9 filed Feb. 17, 2014, the contents of which are hereby incorporated by reference in their entirety.

TECHNICAL FIELD

The invention relates to a method and a device for discharging a stratified thermal storage tank.

BACKGROUND

Stratified thermal storage tanks enable the generation of energy to be dissociated, with respect to time, from energy use. In particular, in the case of fluctuating energy sources such as, for example, regenerative energies, such a dissociation with respect to time ensures the supply of energy, in particular electrical energy. For the purpose of discharging, stratified thermal storage tanks may be coupled to general steam circuits and/or ORC systems (organic Rankine cycle; ORC). The use of a stratified thermal storage tank coupled to an ORC system thus enables the generation of thermal energy and the output of electrical energy and/or thermal energy, the electrical energy being provided by the ORC system, to be dissociated, with respect to time, at an energy consumer, thereby making it possible, for example, to balance out load peaks in energy demand, such that, overall, the security of supply improves.

A stratified thermal storage tank can be discharged by means of an ORC system. In this case, the heat is transferred, via walls of a heat exchanger, to a working fluid of the ORC system. To ensure the transfer of heat from the stratified thermal storage tank to the working fluid of the ORC system, certain temperature differences are required, as a driving force for the transfer of heat. At the same time, said temperature differences delimit the temperature level of the thermal energy (heat), i.e. its utilizable value, that can be extracted from the stratified storage tank. In addition, structural space that cannot be used for the storage of thermal energy in the stratified thermal storage tank must be made available for the heat transfer surfaces of a heat exchanger.

A stratified thermal storage tank, having a heat exchanger that has heat transfer surfaces, is discharged by means of the ORC system in that a working fluid of the ORC system on the primary side within the heat exchanger absorbs heat from the heat transfer medium of the stratified storage tank (secondary side).

For the purpose of absorbing the heat, it is known from the prior art to route the heat transfer medium of the stratified thermal storage tank through a vaporizer of the ORC system. Furthermore, it is known from the prior art to route the working fluid of the ORC system through a vaporizer that is located inside the stratified thermal storage tank and that is in thermal contact with the heat transfer medium of the stratified thermal storage tank. In other words, the heat from the stratified thermal storage tank is always transferred to the ORC system through a vaporizer, in which vaporization of the working fluid of the ORC system occurs, the vaporizer in the first-mentioned case being located outside the stratified thermal storage tank, and in the second-mentioned case being located inside it. For an efficient transfer of the heat from the heat transfer medium to the working fluid, the vaporizers according to the prior art have extensive heat transfer surfaces, which, on the one hand, require a large structural space and, on the other hand, reduce the cost effectiveness of the stratified thermal storage tank, owing to the high investment costs.

SUMMARY

One embodiment provides a method for discharging a stratified thermal storage tank, in which a first stratified thermal storage tank has a first temperature in a first sub-region and has a second temperature in a second sub-region, in which a working fluid of an organic Rankine cycle in the liquid state of aggregation is introduced into a fluid heat transfer medium of the first stratified thermal storage tank, into the first or second sub-region, and brought into direct material contact with the heat transfer medium, wherein, in the second sub-region at the second temperature, the pressure in the first stratified thermal storage tank is less than or equal to the vapor pressure of the working fluid.

In one embodiment, working fluid vaporized in the first stratified thermal storage tank is returned to the organic Rankine cycle.

In one embodiment, a working fluid is used whose density prior to the vaporization in the stratified thermal storage tank is always less than or equal to the density of the heat transfer medium.

In one embodiment, the vapor pressure of the working fluid is less than 1 MPa at a second temperature of 130° C.

In one embodiment, a working fluid is used that comprises at least one of the substances 1,1,1,2,2,4,5,5,5-nonafluoro-4-(trifluoromethyl)-3-pentanone, perfluoromethylbutanone, 1-chloro-3,3,3-trifluoro-1-propene, cis-1,1,1,4,4,4-hexafluoro-2-butene and/or cyclopentane.

In one embodiment, water is used as a fluid heat transfer medium.

In one embodiment, a working fluid is used that, in the liquid state of aggregation, is not miscible with the heat transfer medium.

In one embodiment, a controlled pressurized storage tank is used as a stratified thermal storage tank.

In one embodiment, the liquid working fluid is introduced into the heat transfer medium by means of a distributing device, wherein the distributing device distributes the working fluid homogeneously in a layer of constant first or second temperature of the heat transfer medium.

In one embodiment, working fluid accumulated in the heat transfer medium is returned to the organic Rankine cycle.

In one embodiment, a phase-change material is used in the stratified thermal storage tank for storing thermal energy.

In one embodiment, a second stratified thermal storage tank is used, which second stratified thermal storage tank is fluidically coupled to the first stratified thermal storage tank via the heat transfer medium, wherein heat transfer medium of the second stratified thermal storage tank, having a second temperature, is supplied to the first stratified thermal storage tank, in the second sub-region, and in the first sub-region of the first stratified thermal storage tank heat transfer medium of the first stratified thermal storage tank, having a first temperature, is returned to the second stratified thermal storage tank.

Another embodiment provides a device for discharging a stratified thermal storage tank, comprising a system designed to execute an organic Rankine cycle, and a first stratified thermal storage tank, which has a first temperature in a first sub-region and has a second temperature in a second sub-region, wherein the first stratified thermal storage tank and the system are designed and coupled in such a manner that a working fluid of an organic Rankine cycle in the liquid state of aggregation is introduced into a fluid heat transfer medium of the first stratified thermal storage tank, into the first or second sub-region, and brought into direct material contact with the heat transfer medium, wherein, in the second sub-region at the second temperature, the pressure in the first stratified thermal storage tank is less than or equal to the vapor pressure of the working fluid.

In one embodiment, the first stratified thermal storage tank comprises a distributing device, which is designed to distribute the liquid working fluid homogeneously in a layer of constant first or second temperature of the heat transfer medium.

In one embodiment, the first and the second stratified thermal storage tank are designed and fluidically coupled via the heat transfer medium, in such a manner that heat transfer medium of the second stratified thermal storage tank, having a second temperature, is supplied to the first stratified thermal storage tank, in the second sub-region, and in the first sub-region of the first stratified thermal storage tank heat transfer medium of the first stratified thermal storage tank, having a first temperature, is returned to the second stratified thermal storage tank.

BRIEF DESCRIPTION OF THE DRAWINGS

Example aspects and embodiments of the invention are discussed in detail below with reference to the figures, in which.

DETAILED DESCRIPTION

Figure 1:
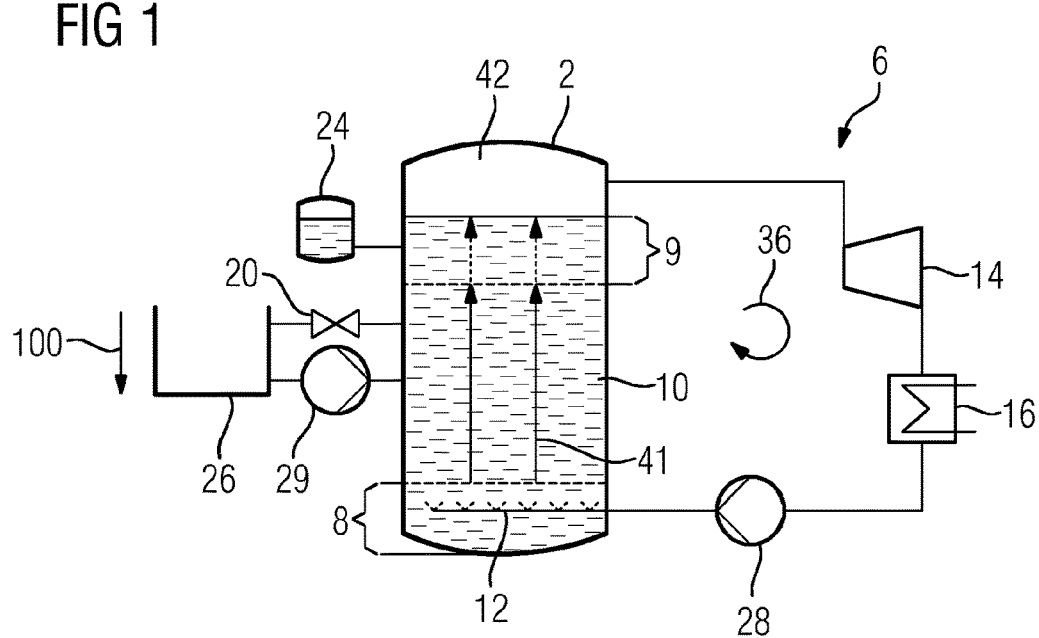
FIG. 1 shows a controlled pressurized storage tank coupled to an ORC system, wherein a working fluid of the ORC system is introduced directly into the heat transfer medium of the pressurized storage tank and has a lesser density than the heat transfer medium.

Embodiments of the present invention are directed to improving the discharging of a stratified thermal storage tank.

Some embodiments provide a method for discharging a stratified thermal storage tank, in a first stratified thermal storage tank, which has a first temperature in a first sub-region and has a second temperature in a second sub-region, a working fluid of an organic Rankine cycle in the liquid state of aggregation is introduced into a fluid heat transfer medium of the first stratified thermal storage tank, into the first or second sub-region, and brought into direct material contact with the heat transfer medium, wherein, in the second sub-region at the second temperature, the pressure in the first stratified thermal storage tank is less than or equal to the vapor pressure of the working fluid.

The working fluid of an ORC system in the liquid state of aggregation may be introduced directly into the fluid heat transfer medium of the stratified storage tank, as a result of which a direct material contact is effected between the heat transfer medium and the working fluid. In this case, in principle, there are two cases to be distinguished. On the one hand, the working fluid of the ORC system may have a greater density than the heat transfer medium. On the other hand, a lesser density of the working fluid, with respect to the heat transfer medium, is possible.

If the density of the working fluid is greater than that of the heat transfer medium, then it is preferred that the working fluid be introduced into the second sub-region of the stratified thermal storage tank. In the case of a lesser density of the working fluid, with respect to the fluid heat transfer medium in the stratified thermal storage tank, it is provided that the working fluid be introduced into the first sub-region of the stratified thermal storage tank.

In the case of a lesser density of the working fluid, with respect to the density of the fluid heat transfer medium, it is preferred that the working fluid be introduced into the first sub-region of the stratified thermal storage tank. In particular, the first sub-region of the stratified thermal storage tank has a lesser temperature than the second sub-region of the stratified thermal storage tank. In other words, the first temperature is lower than the second temperature. As a result of the working fluid being of a lesser density with respect to the density of the heat transfer medium, the working fluid introduced in the liquid state into the heat transfer medium rises in the stratified storage tank and thereby enters the second sub-region of the stratified thermal storage tank. The second sub-region in this case is located above the first sub-region, relative to the force of gravity prevailing at the site of the stratified storage tank. The direct material contact and the rising of the liquid working fluid into the second sub-region of the stratified thermal storage tank thus result in a vaporization of the liquid working fluid in the second sub-region of the stratified thermal storage tank. This is the case because the pressure in the stratified thermal storage tank, in the second sub-region, is less than or equal to the vapor pressure of the working fluid. The vapor pressure of the working fluid in this case depends on the second temperature in the second sub-region of the stratified thermal storage tank, and is to be adjusted according to said second temperature. The term vapor pressure denotes the pressure at which the liquid working fluid of the ORC system transforms from the liquid to the gaseous state of aggregation, this being at the temperature that exists in the second sub-region of the stratified thermal storage tank, i.e. at the second temperature. In other words, the vaporization point of the liquid working fluid is attained in the second sub-region of the stratified thermal storage tank. As a result of the direct material contact of the liquid working fluid with the fluid heat transfer medium of the stratified storage tank, and the vaporization of the working fluid effected as a result in the second sub-region, the heat of the stratified thermal storage tank in the second sub-region is transferred directly from the heat transfer medium of the stratified thermal storage tank to the working fluid by means of the vaporization process. Therefore, there is no need for additional vaporizers having heat exchangers and/or heat transfer surfaces. As the disclosed system and method dispenses with vaporizers, heat exchangers and/or heat transfer surfaces, additional losses of thermal energy in or at said components can be avoided, thereby increasing the efficiency of the discharging of the stratified thermal storage tank.

A further advantage of the direct material contact of the liquid working fluid with the fluid heat transfer medium of the stratified thermal storage tank is that a higher second temperature, and consequently a higher vapor pressure, can be attained. If, advantageously, the working fluid vaporized in the stratified thermal storage tank is returned to a turbine of the ORC system, then the input pressure, corresponding substantially to the vapor pressure, into the turbine can thereby be increased, thereby rendering possible a greater efficiency of the ORC system in the generation of electricity.

If the liquid working fluid of the ORC system has a greater density than the fluid heat transfer medium in the stratified thermal storage tank, then the invention provides that the liquid working fluid be introduced into the second sub-region of the stratified thermal storage tank. In other words, the liquid working fluid is introduced directly into a sub-region of the stratified thermal storage tank and brought into material contact with the heat transfer medium, in which the pressure is less than or equal to the vapor pressure of the working fluid. As a result, immediately after the working fluid emerges into the stratified thermal storage tank, vaporization of the working fluid occurs. Advantageously, the liquid working fluid of the ORC system is introduced into a sub-region of the stratified thermal storage tank that has a (second) temperature that is as high as possible. The working fluid vaporized following the material contact with the heat transfer medium in the stratified thermal storage tank has a lesser density, following vaporization, than the fluid heat transfer medium, and can consequently be routed in the vaporous state of aggregation to the turbine of the ORC system. Again, the heat of the stratified thermal storage tank is transferred to the working fluid by means of the process of vaporizing the working fluid, and introduced into the working circuit of the ORC system. Generally, it is advantageous to use for the ORC system a working fluid having a vapor pressure that corresponds to the pressure in the stratified thermal storage tank at a (second) temperature that is as high as possible. In other words, the working fluid vaporizes only at a (second) temperature that is as high as possible, which temperature, at best, is equal to the highest temperature in the stratified thermal storage tank. As a result, advantageously, the efficiency of the transfer of heat from the heat transfer medium to the working fluid of the ORC system is improved.

The disclosed device for discharging a stratified thermal storage tank comprises a system designed to execute an organic Rankine cycle, and a first stratified thermal storage tank, which has a first temperature in a first sub-region and has a second temperature in a second sub-region, wherein the first stratified thermal storage tank and the system are designed and coupled in such a manner that the working fluid of the organic Rankine cycle in the liquid state of aggregation is introduced into a fluid heat transfer medium of the first stratified thermal storage tank, into the first or second sub-region, and brought into direct material contact with the heat transfer medium, wherein, in the second sub-region at the second temperature, the pressure in the first stratified thermal storage tank is less than or equal to the vapor pressure of the working fluid.

The disclosed device enables the liquid, and subsequently also the vaporized (gaseous), working fluid to be in direct material contact with the fluid heat transfer medium of the stratified thermal storage tank. Resulting advantages are of the same type as for the disclosed method discussed above.

In one embodiment, working fluid vaporized in the first stratified thermal storage tank is returned to the organic Rankine cycle. Returning the vaporized, and therefore gaseous, working fluid renders possible a particularly advantageous cycle process for discharging the stratified thermal storage tank. It may be provided that, before being returned into the working cycle in the ORC system, the vaporized working fluid be routed through a separator, which separates out residues of the heat transfer medium that are present in the vaporized working fluid, such that scarcely any heat transfer medium, and at best no heat transfer medium, is discharged into the working circuit of the ORC system. The material separation of working fluid and heat transfer medium to be effected following the vaporizing of the working fluid is not restricted to the use of separators, and may be effected by known and/or equivalent devices according to the prior art.

According to one embodiment, a working fluid is used whose density prior to the vaporization in the stratified thermal storage tank is less than or equal to the density of the heat transfer medium, wherein a constantly genuinely lesser density of the working fluid is preferred.

The lesser density of the liquid working fluid, as compared with the fluid heat transfer medium, has the advantage that the working fluid can be introduced or fed into the first sub-region, at the first temperature, of the stratified thermal storage tank. The action of the force of gravity prevailing at the site of the stratified thermal storage tank causes the less dense working fluid, as compared with the heat transfer medium, to rise to the second sub-region of the stratified thermal storage tank. The first sub-region of the stratified thermal storage tank in this case is located below the second sub-region, the relative terms above and below relating, as known, to the prevailing direction of the force of gravity. Typically, the heat transfer medium in the stratified thermal storage tank will therefore, in the second sub-region, have a second temperature, which is greater than the first temperature of the first sub-region of the stratified thermal storage tank. The advantage of the lesser density of the liquid working fluid and the resultant rising of the working fluid is that the working fluid is heated up to the temperature of the stratified thermal storage tank that exists in the second sub-region, thereby improving the transfer of heat between the heat transfer medium and the liquid working fluid. A further advantage is that, as a result of rising, the liquid working fluid is constantly in material contact with the heat transfer medium of the stratified thermal storage tank, such that slow heating of the working fluid, from the first temperature to the second temperature, is effected.

In one embodiment, a working fluid is used that, at a temperature of 130° C. (403.15 K), has a vapor pressure of less than 1 MPa.

Working fluids that, at a temperature of 130° C., have a vapor pressure of less than 1 MPa are designated here as low-pressure fluids. An advantage of such low-pressure fluids is that, in combination with known stratified thermal storage tanks, they render possible a particularly preferred application of the disclosed method. This is the case because typical stratified thermal storage tanks according to the prior art, in particular water stratified storage tanks, have a pressure that is less than 1 MPa, and in particular in the range of from 0.3 MPa to 1 MPa. In this case, the working fluid of the ORC system should vaporize at a second temperature that is as high as possible. Consequently, the pressure beneath the second sub-region in the stratified thermal storage tank must always be greater than the vapor pressure of the working fluid. It is only in the second sub-region of the stratified thermal storage tank, at the second temperature, for example at a second temperature of 130° C., that vaporization of the working fluid occurs.

At 130° C., typical working fluids used in ORC systems, such as, for example, R245fa, have a vapor pressure in the range of from 2 MPa to 3 MPa. The vapor pressure of said working fluids is therefore significantly greater than the pressure that is typically present in the stratified thermal storage tank as a whole, such that, in the case of introduction of the working fluid at a temperature of, for example, 50° C., vaporization of the working fluid would already be possible. Typical working fluids according to the prior art, for example R245fa, would consequently already vaporize at a (first) temperature that is lower than the highest temperature present in the stratified thermal storage tank, such that the transfer of heat from the heat transfer medium of the stratified thermal storage tank to the introduced working fluid of the ORC system would be effected at an unfavorable, low temperature. Low-pressure fluids, by contrast, have a vapor pressure that is in the range of the pressures prevailing in stratified storage tanks, such that these fluids vaporize only upon attaining the second temperature.

Of particular importance are working fluids that comprise at least one of the substances 1,1,1,2,2,4,5,5,5-nonafluoro-4-(trifluoromethyl)-3-pentanone (trade name Novec™ 649), perfluoromethylbutanone, 1-chloro-3,3,3-trifluoro-1-propene, cis-1,1,1,4,4,4-hexafluoro-2-butene and/or cyclopentane.

According to the present disclosure, said substances can be used in combination with stratified thermal storage tanks known according to the prior art. For example, at a temperature of 130° C., 1,1,1,2,2,4,5,5,5-nonafluoro-4-(trifluoromethyl)-3-pentanone (trade name Novec™ 649) has a vapor pressure of 0.87 MPa, and cyclopentane has a vapor pressure of 0.8 MPa. At 130° C., therefore, the vapor pressure of said fluids is significantly below the vapor pressure of, for example, R245fa, which has a vapor pressure of 2.34 MPa. A further advantage of said substances is their technical manageability. They are characterized by good environmental compatibility and their safety properties, such as, for example, non-combustibility and very low greenhouse-gas potential. In general, the substances Novec™ 649 and perfluoromethylbutanone can be assigned to the fluoroketone substance group, while cyclopentane can be assigned to the cycloalkane substance group.

In a further embodiment, water is used as a fluid heat transfer medium.

Water as a heat transfer medium is characterized by its high specific thermal capacity, as compared with other heat transfer media. Consequently, the stratified thermal storage tank, which is then realized as a thermal water stratified storage tank, has a greater storage capacity, as compared with other stratified storage tanks, in the case of typical temperature differences between an in storage temperature and an out storage temperature of the stratified thermal storage tank. In particular, water is typically available in sufficient quantities. A further advantage of water as a heat transfer medium is that water does not easily dissolve in said working fluids, for example in Novec™ 649 or cyclopentane.

If water is used as a heat transfer medium in the stratified thermal storage tank, then, in particular, a controlled pressurized storage tank, or a controlled pressurized water storage tank, is advantageous as a stratified thermal storage tank.

The use of a controlled pressurized storage tank enables the pressure in the stratified thermal storage tank to be controlled within a pressure range. The control of the pressure in the pressurized storage tank enables the pressure within the pressurized storage tank to be adjusted to the vapor pressure of the working fluid, such that, irrespective of the second temperature, vaporization of the working fluid occurs in the second sub-region of the pressurized storage tank. The pressure in this case is controlled in such a manner that no vaporization of the working fluid occurs beneath the second sub-region, at the temperature prevailing beneath the second sub-region. As a result, vaporization of the liquid working fluid can be achieved in a layer of the pressurized storage tank that is as warm as possible. In this case, the temperature of the pressurized storage tank, and also of a general stratified thermal storage tank, is correlated with the height of the layer, such that a vaporization position that is as high as possible corresponds to a temperature that is as high as possible. In particular, it is advantageous if, in a sub-region in which the vaporized (gaseous) working fluid is routed out of the stratified thermal storage tank and routed into the turbine of the ORC system, the stratified thermal storage tank has the inlet pressure for the turbine, an inlet pressure that is as high as possible being preferred. Consequently, the pressure beneath the second sub-region, in particular in the first sub-region of the first stratified thermal storage tank, is greater than in the second sub-region of the stratified thermal storage tank, since the hydrostatic pressure in the stratified storage tank decreases with the height.

According to a further embodiment, a working fluid is used that, in the liquid state of aggregation, is scarcely miscible, in particular is not miscible, with the heat transfer medium.

In other words, the liquid working fluid and the fluid heat transfer medium realize a two-phase fluid, the one phase being constituted by the liquid working fluid and the other phase being constituted by the fluid heat transfer medium. A working fluid having a low miscibility with the heat transfer medium in the liquid state of aggregation may also be provided. In particular, a working fluid having a low solubility, both in the liquid and in the gaseous state of aggregation, in the heat transfer medium is preferred.

Since the mixture of working fluid and heat transfer medium exists as a two-phase mixture, material separation of said fluids is easily achievable. In particular, the liquid working fluid does not mix with the heat transfer medium, such that residues of the working fluid, which could accumulate in the heat transfer medium, are reduced as a result. In particular, the already mentioned low-pressure fluids Novec™ 649, perfluoromethylpentanone and cyclopentane have poor solubility in water, which is particularly preferred as a heat transfer medium, and therefore only small quantities thereof are miscible with water. For example, only 20 ppm water dissolve in Novec™ 649.

In a further embodiment, the liquid working fluid is introduced into the heat transfer medium by means of a distributing device, wherein the distributing device distributes the working fluid homogeneously in a layer of constant first or second temperature of the heat transfer medium.

Stratified thermal storage tanks, for example water stratified storage tanks or controlled water stratified storage tanks (pressurized storage tanks) have a stratified structure in respect of the temperature of their heat transfer medium, each layer having a certain temperature and density. In respect of the efficiency of the transfer of heat from the heat transfer medium to the working fluid, it is therefore advantageous to distribute the liquid working fluid uniformly, or homogeneously, in one of these layers. The terms uniform and homogeneous are to be understood in each case to be approximate, as is the temperature or density of a layer.

Typical stratified storage tanks are oriented vertically—relative to the force of gravity prevailing at the site of the stratified storage tank—such that the individual layers of the stratified storage tank extend horizontally. The uniform distribution of the liquid working fluid in a layer of the fluid heat transfer medium, in particular in a layer located in the first or the second sub-region of the stratified thermal storage tank, has the effect of enlarging the surface of the material contact (contact surface) between the heat transfer medium and the liquid working fluid, thereby improving the efficiency of the transfer of heat from the heat transfer medium to the working fluid.

In addition, a uniform distribution of the liquid working fluid in a horizontal layer of the stratified thermal storage tank enables a distribution of the impulses of the incoming working fluid to be as uniform as possible, such that unwanted mixing processes, possibly resulting in intermixing of the layers, can be prevented.

Possible distributing devices are, for example, horizontal distributing pipe systems, such as those used in stratified storage tanks. In particular, the distributing devices known therein result in a reduction of the rate of admission of the working fluid into the heat transfer medium (cf. Göppert et al. Chemie Ingenieur Technik, 2008, 80 No. 3). Furthermore, the rate of admission of the gaseous working fluid may be regulated by alteration of the cross-sectional area of admission holes of the distributing device. A further advantage of the regulation of the cross-sectional areas of the admission holes is that a primary bubble size of the gaseous working fluid can be set.

In a further embodiment, working fluid accumulated in the heat transfer medium is returned to the organic Rankine cycle of the ORC system.

Due to the direct material contact of the liquid and/or gaseous working fluid with the heat transfer medium of the stratified thermal storage tank, it is not possible, in principle, to prevent the working fluid from getting into the heat transfer medium of the stratified thermal storage tank. This working fluid accumulated in the heat transfer medium of the stratified thermal storage tank is advantageously separated from the heat transfer medium of the stratified thermal storage tank and returned back to the organic Rankine cycle of the ORC system. The material separation of working fluid, accumulated in the heat transfer medium, and the heat transfer medium may be effected by means of separating devices and/or separators known according to the prior art and/or equivalent.

According to a further embodiment, a phase-change material (PCM) is used in the stratified thermal storage tank for storing thermal energy. The stratified storage tank thus comprises two heat transfer media, the further heat transfer medium being realized as a phase-change material. Phase-change materials, or phase-change storage tanks, are preferred because they can store thermal energy with low loss, with many cycle repetitions and over a long time period. In particular, a phase-change material is preferred whose melting point (phase-change temperature) is lower than the vaporization temperature (second temperature) of the liquid working fluid (at vapor pressure). For example, the vaporization temperature of the liquid working fluid in the second sub-region may be 130° C., such that a melting point of 125° C. of the phase-change material is preferred. A melting point that is at most 5% lower than the vaporization temperature is thus preferred.

Preferably, the stratified storage tank may comprise further heat transfer media, present in the solid state of aggregation. In this case, the porosity of the solid heat transfer media may be adapted to the purpose. For example, the porosity may be selected so as to enable the liquid working fluid, which is of a lesser density than the fluid heat transfer medium, to rise.

According to a particular embodiment, a second stratified thermal storage tank is used, which second stratified thermal storage tank is fluidically coupled to the first stratified thermal storage tank via the heat transfer medium, wherein heat transfer medium of the second stratified thermal storage tank, having a second temperature, is supplied to the first stratified thermal storage tank, in the second sub-region, and in the first sub-region of the first stratified thermal storage tank heat transfer medium of the first stratified thermal storage tank, having a first temperature, is returned to the second stratified thermal storage tank.

In this case, a second stratified thermal storage tank is preferred that, owing to the fluid heat transfer medium present therein, has a thermal capacity that is substantially greater than that of the first stratified thermal storage tank. Advantageously, the process of vaporization of the working fluid, in respect of the second stratified thermal storage tank, is thereby transferred into the first stratified thermal storage tank. This makes it possible to avoid disturbance and/or intermixing of the layers in the second stratified thermal storage tank, which, owing to its substantially greater thermal capacity, as compared with the first stratified thermal storage tank, constitutes the actual stratified thermal storage tank for storing the thermal energy.

The first and the second stratified thermal storage tank are coupled in such a manner that the heat transfer medium is introduced at the second temperature (warm) into the second sub-region of the first stratified thermal storage tank, and heat transfer medium having a first temperature (cold) is returned from the first sub-region of the first stratified thermal storage tank to the second stratified thermal storage tank. In other words, the second stratified thermal storage tank is discharged by means of the first stratified thermal storage tank.

According to a further embodiment, the first stratified thermal storage tank comprises a distributing device, which is designed to distribute liquid working fluid homogeneously in a layer of constant first or second temperature of the heat transfer medium.

A uniform distribution of the working fluid in a horizontal layer of the stratified thermal storage tank creates an advantageous distribution of the working fluid in the fluid heat transfer medium, which additionally prevents possible intermixing of the layers. Advantages similar and equivalent to those of the already explained method ensue from the use of a distributing device.

According to a further embodiment, the device comprises a second stratified storage tank, wherein the first and the second stratified thermal storage tank are designed and fluidically coupled via the heat transfer medium, in such a manner that heat transfer medium of the second stratified thermal storage tank, having a second temperature, is supplied to the first stratified thermal storage tank, in the second sub-region, and in the first sub-region of the first stratified thermal storage tank heat transfer medium of the first stratified thermal storage tank, having a first temperature, is returned to the second stratified thermal storage tank.

As already in the case of the method, a second stratified thermal storage tank that has a substantially greater heat capacity than the first stratified thermal storage tank is preferred. The second stratified thermal storage tank thus enables the vaporization process to be transferred from the second stratified thermal storage tank, which realizes the actual stratified storage tank for the thermal energy, into the first stratified thermal storage tank. In this case, the heat of the second stratified thermal storage tank, which is fluidically coupled in the stated manner to the first stratified thermal storage tank, via the fluid heat transfer medium, is transferred into the first stratified thermal storage tank and used for vaporizing the working fluid in the first stratified thermal storage tank. In addition to the stated advantages, advantages ensue that are similar and equivalent to those of the already discussed method.

FIG. 1 shows a pressurized storage tank 2, the pressure of which can be controlled within a pressure range. The pressurized storage tank 2 in this case is coupled to an ORC system 6 in such a manner that a working fluid 41 in the liquid state of aggregation is introduced into a heat transfer medium 10 of the controlled pressurized storage tank 2 via a distributing device 12. The ORC system 6 in this case comprises a turbine 14, a condenser 16 and a feed pump 28. The stated components of the ORC system 6 thus realize an organic Rankine cycle 36.

In this exemplary embodiment, the heat transfer medium 10 of the controlled pressurized storage tank 2 is water 10. Moreover, the controlled pressurized storage tank 2 is oriented vertically with respect to a force of gravity 100 prevailing at the site of the pressurized storage tank 2. As a result, the controlled pressurized storage tank 2 has, in a first sub-region 8, a first temperature that is less than a second temperature of a second sub-region 9 of the pressurized thermal storage tank 2. In other words, the first sub-region 8 is located below the second sub-region 9, in relation to the vertical orientation of the pressurized storage tank 2.

FIG. 1 additionally shows an expansion vessel 24, a pump 29, an expansion valve 20 and a reservoir 26. The stated components 20, 24, 26, 29 serve to control the pressurized storage tank 2 and/or the heat transfer medium 10.

The liquid working fluid 41 of the ORC system 6 is introduced into the first sub-region 8 of the controlled pressurized storage tank 2, via the distributing device 12, in such a manner that the heat transfer medium 10 is in direct material contact with the working fluid 41. The working fluid 41 in this case is of a lesser density than the heat transfer medium 10. Owing to the lesser density of the working fluid 41, the working fluid 41 rises within the heat transfer medium 10. Owing to the pressure within the pressurized storage tank 2, and owing to the hydrostatic pressure of the water column, no vaporization of the working fluid 41 occurs as the working fluid 41 rises. It is only in the second sub-region 9 of the pressurized storage tank 2 that the pressure in the pressurized storage tank 2 is less than or equal to the vapor pressure of the working fluid 41. As a result, vaporization of the working fluid 41 occurs, at the second temperature, in the second sub-region 9 of the pressurized storage tank 2. In other words, the vaporization point of the working fluid 41 is attained only in the second sub-region 9 of the pressurized thermal storage tank 2. As a result, advantageously, the heat stored in the heat transfer medium 10 is transferred, at a temperature level that is as high as possible, corresponding to the second temperature in the second sub-region 9 of the stratified thermal storage tank 2, to the working fluid 41, 42.

The vaporized working fluid 42 accumulates at an upper end of the pressurized thermal storage tank 2, and from there can be returned back to the working circuit 36 of the ORC system 6, in particular to the turbine 14.

Figure 2:
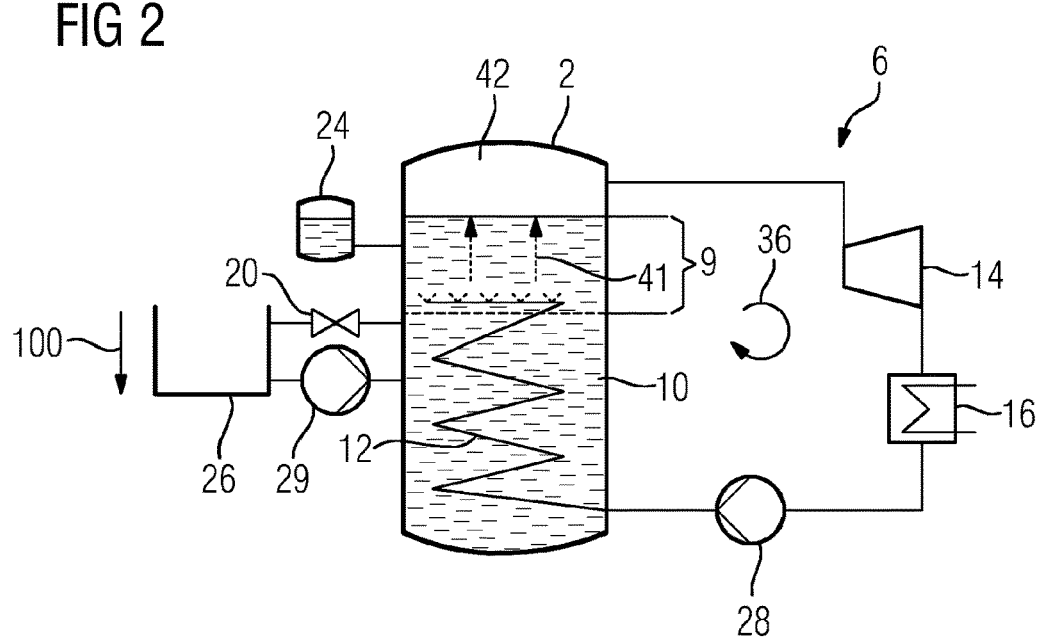
FIG. 2 shows a controlled pressurized storage tank coupled to an ORC system, wherein a working fluid of the ORC system is introduced directly into the heat transfer medium of the stratified storage tank, and the working fluid in the liquid state of aggregation has a greater density than the heat transfer medium.

For example, cyclopentane ($C_5H_{10}$), having a density of 650 kg/m$^3$, may be used as a working fluid 41. After being introduced into the pressurized storage tank 2, the working fluid 41 consequently rises upward, since water 10 has a density of 1000 kg/m$^3$, and is thus significantly more dense than cyclopentane. FIG. 2 shows a structure that is substantially of the same type as in FIG. 1. Unlike FIG. 1, in FIG. 2 a working fluid 41 is used that is of a greater density than the heat transfer medium 10. In this case, again, water is provided as a heat transfer medium 10. To enable the working fluid 41, which has a greater density than the heat transfer medium 10, to vaporize at a temperature of the pressurized thermal storage tank 2 that is as high as possible, the working fluid 41 may be introduced into the second sub-region 9 of the pressurized thermal storage tank 2 via the distributing device 12. In this case, the working fluid 41 is introduced via a pipe system of the distributing device 12, the pipe system extending helically—in a zigzag manner in the representation—from a lower end of the pressurized storage tank 2 to the second sub-region 9 of the pressurized thermal storage tank 2. In other words, the working fluid 41 vaporizes immediately after emerging from the distributing device 12, in the second sub-region 9 of the pressurized storage tank 2.

The vaporized working fluid 42, which, as a result of the vaporization process in the second sub-region 9, absorbs the heat from the pressurized thermal storage tank 2, or from the heat transfer medium 10, at the second temperature, accumulates at an upper end of the pressurized thermal storage tank 2 because it now has a lesser density than the heat transfer medium 10. From there, the vaporized (gaseous) working fluid 42 can be taken out of the pressurized thermal storage tank 2 and supplied to the turbine 14 of the ORC system 6.

Figure 3:
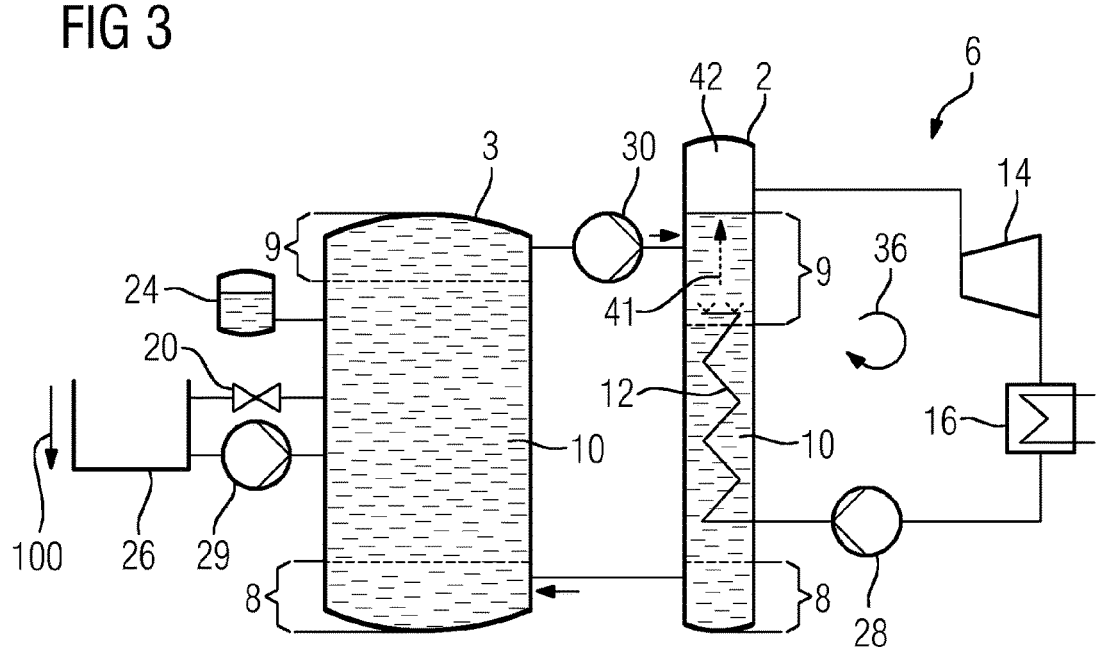
FIG. 3 shows a second pressurized thermal storage tank, which is fluidically coupled to a first pressurized thermal storage tank by means of a heat transfer medium.

FIG. 3 shows a second pressurized thermal storage tank 3, which is fluidically coupled to the first pressurized thermal storage tank 2 via the heat transfer medium 10. In this case, the second pressurized thermal storage tank 3 has a substantially greater thermal capacity than the first pressurized thermal storage tank 2. The first pressurized thermal storage tank 2 is coupled to the ORC system 6, as represented in FIG. 2. The working fluid 41 of the ORC system 6 is introduced into the pressurized thermal storage tank 2 and brought into direct material contact with the heat transfer medium 10. As already in FIG. 2, the working fluid 41 in this case has a greater density than the heat transfer medium 10.

Owing to its greater thermal capacity, in comparison with the first pressurized storage tank 2, the second pressurized thermal storage tank 3 is the actual pressurized thermal storage tank, which serves to store the thermal energy. In the exemplary embodiment shown in FIG. 3, the process of vaporizing the working fluid 41 has thus been dissociated from the site at which the thermal energy is stored. For this purpose, heat transfer medium 10 is removed from the second pressurized thermal storage tank 2, in a second sub-region 9, by means of a pump 30, and supplied to the second sub-region 9 of the first pressurized thermal storage tank 2. In other words, the transfer of heat from the second pressurized thermal storage tank 3 to the first pressurized thermal storage tank 2 is effected by means of the common heat transfer medium 10. The heat is then transferred from the first pressurized thermal storage tank 2 to the ORC system 6 by the vaporization of the working medium 41.

Advantageously, the first pressurized thermal storage tank 2 constitutes a kind of vaporization column for the second pressurized thermal storage tank 3. Transferring the vaporization process from the second pressurized thermal storage tank 3 into the first pressurized thermal storage tank 2 advantageously avoids intermixing of the layers in the second pressurized thermal storage tank 3.

A further advantage of transferring the vaporization process is that heat can be extracted from the pressurized thermal storage tank 3, in a manner known from the prior art, and routed to a heat consumer, not represented. Consequently, an additional process, known from the prior art, for discharging the second pressurized thermal storage tank 3 thereby becomes possible. The exemplary embodiments shown in FIGS. 1, 2 and 3 may additionally comprise built-in components for charging the pressurized thermal storage tank 2 and/or the pressurized thermal storage tank 3. In this case, the pressurized storage tanks 2, 3 may be charged by a direct and/or indirect supply of heat.

In the case of direct supply of heat, warm heat transfer medium 10 flows directly into the pressurized storage tank 2, 3. As a result of the inflow of the warm heat transfer medium 10, cold heat transfer medium 10 is simultaneously drawn off, and the pressurized storage tank 2, 3 is thus charged with thermal energy (heat). In contrast to the direct charging of the pressurized storage tank 2, 3, in the case of indirect charging the transfer of heat is effected by an indirect thermal contact of the heat transfer medium with a heat source. For example, additional built-in components, in particular heat exchangers and/or heat transfer surfaces, may be provided for this purpose in the pressurized storage tank 2, 3. Furthermore, for the purpose of charging the pressurized storage tank 2, 3, charging cups, deflector plates and distributor tubes may be provided as built-in components in the pressurized storage tanks 2, 3.

Although the invention has been illustrated and described in greater detail by the preferred exemplary embodiments, the invention is not limited by the disclosed examples, or other variations may be derived therefrom by persons skilled in the art, without departure from the protective scope of the invention.

What is claimed is:

1. A method for discharging a stratified thermal storage tank, in which a first stratified thermal storage tank has a first temperature in a first sub-region and has a second temperature in a second sub-region, the method comprising:
    introducing a working fluid of an organic Rankine cycle in the liquid state of aggregation into a fluid heat transfer medium of the first stratified thermal storage tank, into the first or second sub-region, and
    bringing the working fluid of the organic Rankine cycle into direct material contact with the heat transfer medium,
    wherein, in the second sub-region at the second temperature, the pressure in the first stratified thermal storage tank is less than the vapor pressure of the working fluid and at least part of the working fluid vaporizes in the second sub-region.

2. The method of claim 1, wherein working fluid vaporized in the first stratified thermal storage tank is returned to the organic Rankine cycle.

3. The method of claim 1, wherein a working fluid is used whose density prior to the vaporization in the stratified thermal storage tank is always less than or equal to the density of the heat transfer medium.

4. The method of claim 1, wherein the vapor pressure of the working fluid is less than 1 MPa at a second temperature of 130° C.

5. The method of claim 1, wherein a working fluid is used that comprises at least one of the substances 1,1,1,2,2,4,5,5,5-nonafluoro-4-(trifluoromethyl)-3-pentanone, perfluoromethylbutanone, 1-chloro-3,3,3-trifluoro-1-propene, cis-1,1,1,4,4,4-hexafluoro-2-butene and/or cyclopentane.

6. The method of claim 1, wherein water is used as a fluid heat transfer medium.

7. The method of claim 1, wherein a working fluid is used that, in the liquid state of aggregation, is not miscible with the heat transfer medium.

8. The method of claim 1, wherein a controlled pressurized storage tank is used as a stratified thermal storage tank.

9. The of claim 1, wherein the liquid working fluid is introduced into the heat transfer medium by means of a distributing device, wherein the distributing device distributes the working fluid homogeneously in a layer of constant first or second temperature of the heat transfer medium.

10. The method of claim 1, wherein working fluid accumulated in the heat transfer medium is returned to the organic Rankine cycle.

11. The method of claim 1, wherein a phase-change material is used in the stratified thermal storage tank for storing thermal energy.

12. The method of claim 1, wherein a second stratified thermal storage tank is used, which second stratified thermal storage tank is fluidically coupled to the first stratified thermal storage tank via the heat transfer medium, wherein heat transfer medium of the second stratified thermal storage tank, having a second temperature, is supplied to the first stratified thermal storage tank, in the second sub-region, and in the first sub-region of the first stratified thermal storage tank heat transfer medium of the first stratified thermal storage tank, having a first temperature, is returned to the second stratified thermal storage tank.

13. A device for discharging a stratified thermal storage tank, the device comprising:
    a system configured to execute an organic Rankine cycle, and
    a first stratified thermal storage tank that has a first temperature in a first sub-region and has a second temperature in a second sub-region,
    wherein the first stratified thermal storage tank and the system are configured and coupled such that a working fluid of an organic Rankine cycle in the liquid state of aggregation is introduced into a fluid heat transfer medium of the first stratified thermal storage tank, into the first or second sub-region, and brought into direct material contact with the heat transfer medium,
    wherein, in the second sub-region at the second temperature, the pressure in the first stratified thermal storage tank is less than the vapor pressure of the working fluid and at least part of the working fluid vaporizes in the second sub-region.

14. The device of claim 13, wherein the first stratified thermal storage tank comprises a distributing device configured to distribute the liquid working fluid homogeneously in a layer of constant first or second temperature of the heat transfer medium.

15. The device of claim 13, further comprising a second stratified storage tank, wherein the first and the second stratified thermal storage tank are configured and fluidically coupled via the heat transfer medium, such that heat transfer medium of the second stratified thermal storage tank, having a second temperature, is supplied to the first stratified thermal storage tank, in the second sub-region, and in the first sub-region of the first stratified thermal storage tank heat transfer medium of the first stratified thermal storage tank, having a first temperature, is returned to the second stratified thermal storage tank.

* * * * *